United States Patent
Capps, Jr. et al.

(10) Patent No.: US 8,886,918 B2
(45) Date of Patent: Nov. 11, 2014

(54) DYNAMIC INSTRUCTION EXECUTION BASED ON TRANSACTION PRIORITY TAGGING

(75) Inventors: Louis B. Capps, Jr., Georgetown, TX (US); Robert H. Bell, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1461 days.

(21) Appl. No.: 11/946,504

(22) Filed: Nov. 28, 2007

(65) Prior Publication Data

US 2009/0138682 A1 May 28, 2009

(51) Int. Cl.
 *G06F 9/30* (2006.01)
 *G06F 11/34* (2006.01)
 *G06F 9/50* (2006.01)
 *G06F 9/38* (2006.01)

(52) U.S. Cl.
 CPC .......... *G06F 9/30101* (2013.01); *Y02B 60/142* (2013.01); *G06F 2201/885* (2013.01); *G06F 11/3466* (2013.01); *G06F 11/3409* (2013.01); *Y02B 60/165* (2013.01); *G06F 2201/81* (2013.01); *G06F 9/5011* (2013.01); *G06F 9/3851* (2013.01)
 USPC ........................................................ 712/220

(58) Field of Classification Search
 USPC ........................................................ 712/220
 See application file for complete search history.

(56) References Cited

U.S. PATENT DOCUMENTS

| | | | |
|---|---|---|---|
| 5,535,395 A | 7/1996 | Tipley et al. | 395/729 |
| 6,067,557 A | 5/2000 | Hegde | 709/103 |
| 6,584,488 B1 * | 6/2003 | Brenner et al. | 718/103 |
| 6,587,865 B1 * | 7/2003 | Kimbrel et al. | 718/104 |
| 6,848,015 B2 | 1/2005 | Jones | 710/311 |
| 6,859,926 B1 * | 2/2005 | Brenner et al. | 718/100 |
| 6,981,260 B2 | 12/2005 | Brenner et al. | 718/103 |
| 7,103,735 B2 | 9/2006 | Iyer | 711/158 |
| 2005/0154861 A1 | 7/2005 | Arimilli et al. | 712/216 |
| 2006/0004988 A1 * | 1/2006 | Jordan | 712/43 |
| 2006/0005082 A1 | 1/2006 | Fossum et al. | 714/42 |
| 2007/0079216 A1 | 4/2007 | Bell, Jr. et al. | 714/763 |
| 2007/0130231 A1 * | 6/2007 | Brown et al. | 707/204 |
| 2007/0169125 A1 * | 7/2007 | Qin | 718/102 |
| 2008/0282251 A1 * | 11/2008 | Bruce et al. | 718/103 |

OTHER PUBLICATIONS

Tanenbaum; "Structured Computer Organization"; 1984; Second Edition; p. 10-12.*

* cited by examiner

*Primary Examiner* — William B Partridge
(74) *Attorney, Agent, or Firm* — Terrile, Cannatti, Chambers & Holland, LLP; Michael Rocco Cannatti

(57) ABSTRACT

A method, system and program are provided for dynamically assigning priority values to instruction threads in a computer system based on one or more predetermined thread performance tests, and using the assigned instruction priorities to determine how resources are used in the system. By storing the assigning priority values for each thread as a tag in the thread's instructions, tagged instructions from different threads that are dispatched through the system are allocated system resources based on the tagged priority values assigned to the respective instruction threads. Priority values for individual threads may be updated with control software which tests thread performance and uses the test results to apply predetermined adjustment policies. The test results may be used to optimize the workload allocation of system resources by dynamically assigning thread priority values to individual threads using any desired policy, such as achieving thread execution balance relative to thresholds and to performance of other threads, reducing thread response time, lowering power consumption, etc.

20 Claims, 6 Drawing Sheets

DYNAMIC INSTRUCTION EXECUTION BASED ON TRANSACTION PRIORITY TAGGING

BACKGROUND OF THE INVENTION

1. Field of the Invention

The present invention is directed in general to the field of data processing systems. In one aspect, the present invention relates to performance optimization within a data processing system. In yet another aspect, the present invention relates to a data processing system and method for dynamically prioritizing instruction thread execution to optimize processing of threads in a multiprocessor system.

2. Description of the Related Art

In multi-processor computer systems in which different system resources (such as central processing units (CPUs), memory, input/output (I/O) bandwidth, disk storage, etc.) are each used to operate on multiple instruction threads, there are significant challenges presented for efficiently executing instruction threads so that the system resources are optimally used to run all workloads. These challenges only increase as the number and complexity of cores in a multiprocessor computer grows. Conventional processor approaches have attempted to address workload optimization at the various design phases (e.g., from high level abstract models to VHDL (Very high speed integrated circuit Hardware Description Language) models) by simulating the processor operations for both function and performance, and then using the simulation results to design the scheduler or workload manager operating system (OS) components to allocate system resources to workloads. However, because schedulers and workload managers are software components, the optimizations achieved by these components tend to address high-level performance issues that can readily be monitored by software. As a result, low-level performance issues, such as hardware allocation of shared resources among multiple threads, are not addressed by conventional software-only techniques of performance optimization. Another problem with such conventional system solutions is that there is very often no single a priori correct decision for how to best allocate system resources to individual instruction thread requests, such as steering a request from a core to another system resource, or deciding which request gets to memory first. When the "best" system resource allocation algorithm is selected for the majority of workloads, this resulting in tradeoffs being made which give priority to certain operations or requests at the expense of others. Such tradeoffs can affect all workloads being run on the system, and in some cases end up decreasing the efficiency of execution when the wrong priority is assumed for a given instruction stream.

Accordingly, there is a need for a system and method for determining how to prioritize instruction threads in a multi-processor system so that workload operations on the system are optimized. In addition, there is a need for an instruction stream prioritization scheme which can be dynamically changed during system operation. Further limitations and disadvantages of conventional solutions will become apparent to one of skill in the art after reviewing the remainder of the present application with reference to the drawings and detailed description which follow.

SUMMARY OF THE INVENTION

A dynamic instruction prioritization system and methodology are provided for a processor system wherein instructions in a given thread or stream are tagged or referenced with a priority value or tag so that the priority tags can be used to efficiently allocate system resources for executing the instructions. By evaluating the performance for each instruction thread, the priority of an instruction stream can be dynamically moved up or down during the execution of a workload based on operating system or application priorities. Using a thread priority register at each processor (core) to store the priority values for different instruction threads, each instruction from an instruction thread may be tagged with an assigned priority value that is retrieved from the instruction thread. In this way, the assigned priority flows with the instruction as a tag when the instruction moves to different locations throughout the processor system (e.g., L1 cache, L2 cache, L3 cache, memory controller, interconnect fabric, I/O controller, etc.). As a result of tagging each instruction with its assigned priority, the thread priority may be tracked by all (or selected) hardware as an instruction stream is executed, and decisions about system resource allocations concerning data flow, order of execution, prefetch priority decisions and other complex tradeoffs are efficiently made based on the tagged priority value with each instruction. With instruction tagging, separate thread registers are not required at each hardware unit in the system. In addition, the thread priority may be saved with the state of a thread whenever the thread is preempted by a higher priority request. By propagating the thread priority as a tag in the instruction, the thread priority can be used not only at a core level in a multi-core chip, but also at a system level.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
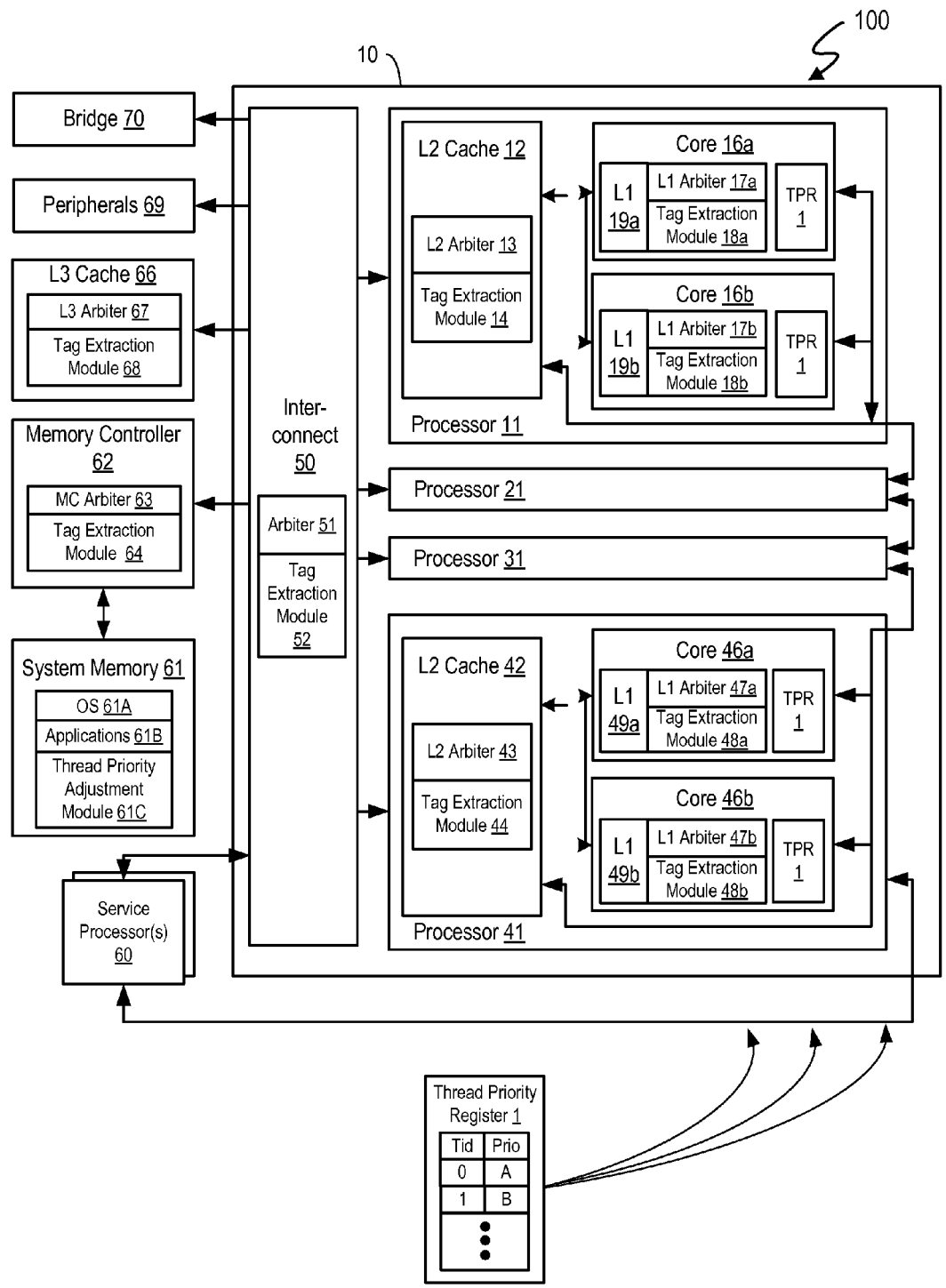
FIG. 1 illustrates a multi-processor computer architecture in which selected embodiments of the present invention may be implemented.

A method, system and program are disclosed for dynamically tagging instructions in a computer system with priority values based on one or more predetermined thread performance tests, and using the assigned instruction priorities to determine how resources are used in the system. To determine a priority level for a given thread, control software (e.g., the operating system or hypervisor) uses performance monitor events for the thread to evaluate or test the thread's performance and to prioritize the thread by applying a predetermined policy based on the evaluation. The test results may be used to optimize the workload allocation of system resources by dynamically assigning thread priority values to individual threads using any desired policy, such as achieving thread execution balance relative to thresholds and to performance of other threads, reducing thread response time, lowering power consumption, etc. In various embodiments, the assigned priority values for each thread are stored in a thread priority register located in one or more hardware locations in the processor system. Upon dispatch of a thread by a processor (core), the control software executes a store to a thread priority register at the processor (core) based on OS-level priorities for the process initiating the thread. After the store occurs to the thread priority register, the first instruction of the application is fetched and then tagged with the priority. After that point, every instruction fetched for that thread is tagged with the current priority value for that thread. As the instruction is dispatched, the priority follows it through the system. Any load or store or other fabric instruction generated by the instruction also inherits that priority tag. As an instruction or command flows through the system with a specific priority, units that respond to those commands can decide on which commands to execute first by extracting the tagged priority value.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Referring now to FIG. 1, there is illustrated a high-level block diagram of a multiprocessor (MP) data processing system 100 that provides improved performance optimization in accordance with selected embodiments of the present invention. The data processing system 100 has one or more processing units arranged in one or more processor groups, and as depicted, includes four processing units 11, 21, 31, 41 in processor group 10. In a symmetric multi-processor (SMP) embodiment, all of the processing units 11, 21, 31, 41 are generally identical, that is, they all use a common set or subset of instructions and protocols to operate, and generally have the same architecture. As shown with processing unit 11, each processing unit may include one or more processor cores 16a, 16b which carry out program instructions in order to operate the computer. An exemplary processing unit would be the POWER5™ processor marketed by International Business Machines Corp. which comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

As further depicted in FIG. 1, each processor core 16a, 16b includes an on-board (L1) cache memory 19a, 19b (typically, separate instruction and data caches) that is constructed from high speed memory devices. Caches are commonly used to temporarily store values that might be repeatedly accessed by a processor, in order to speed up processing by avoiding the longer step of loading the values from system memory 61. A processing unit can include another cache such as a second level (L2) cache 12 which, along with a cache memory controller (not shown), supports both of the L1 caches 19a, 19b that are respectively part of cores 16a and 16b. Additional cache levels may be provided, such as an L3 cache 66 which is accessible via fabric bus 50. Each cache level, from highest (L1) to lowest (L3) can successively store more information, but at a longer access penalty. For example, the on-board L1 caches (e.g., 19a) in the processor cores (e.g., 16a) might have a storage capacity of 128 kilobytes of memory, L2 cache 12 might have a storage capacity of 4 megabytes, and L3 cache 66 might have a storage capacity of 32 megabytes. To facilitate repair/replacement of defective processing unit components, each processing unit 11, 21, 31, 41 may be constructed in the form of a replaceable circuit board, pluggable module, or similar field replaceable unit (FRU), which can be easily swapped, installed in, or swapped out of system 100 in a modular fashion.

The processing units communicate with other components of system 100 via a system interconnect or fabric bus 50. Fabric bus 50 is connected to one or more service processors 60, a system memory device 61, a memory controller 62, a shared or L3 system cache 66, and/or various peripheral devices 69. A processor bridge 70 can optionally be used to interconnect additional processor groups. Though not shown, it will be understood that the data processing system 100 may also include firmware which stores the system's basic input/output logic, and seeks out and loads an operating system from one of the peripherals whenever the computer system is first turned on (booted).

As depicted in FIG. 1, the data processing system 100 includes multiple system resources (e.g., cache memories, memory controllers, interconnects, I/O controllers, etc) which are shared among multiple threads. FIG. 1 also shows that a thread priority register 1 may be located in any one or more of the processor core resources (e.g., 16a, 16b, 46a, 46b) and used to store the priority value for each thread executing on the processor core resource. As shown at the bottom of FIG. 1, each thread priority register 1 may store different priority values (e.g., A, B) for each of its threads (e.g., tid0, tid1, etc.). As described herein, the stored priority value for a thread may be appended or tagged to each instruction from that thread by the respective processor core. To extract the tagged priority value from the instruction as it moves through the system 100, various system resources on the data processing system 100 that may be shared between potentially competing requests from threaded instructions each include tag extraction module in the form of circuitry or control logic that extracts the tagged priority value from each instruction as necessary. Thus, each L1 cache (e.g., 19a, 19b, 49a, 49b) in each core is depicted as having a tag extraction module (e.g., 18a, 18b, 48a, 48b, respectively), and each L2 cache (e.g., 12, 42) in each processor is shown as having a tag extraction module (14, 44, respectively). In similar fashion, the interconnection fabric or bus 50 may have an associated tag extraction module 52, the L3 cache 66 may have an associated tag extraction module 68, and the memory controller 62 may have an associated tag extraction module 64. However, in selected embodiments, a thread priority register is allocated in hardware at each processor core where a thread can be executed in the system 100. In the depicted example, the example thread priority table or register 1 stores thread priority values for two or more threads, where each thread is identified with respective thread ids (tid) {0, 1} and has an assigned thread priority (Prio) value. Thus, the assigned value for tid0 is priority value "A" and the assigned value for tid1 is priority value "B," where "A" and "B" can be any desired representation of one or more priority values. Where the thread priority values for the threads tid0 and tid1 running in the first core 16a are tid0=H (for "high") and tid1=L (for "low"), these values would be included as tags in the instructions for threads tid0 and tid1 as these instructions propagate to other hardware, such as the L2 cache 12 and Interconnect 50. Of course, priority tag values can be used for each instruction thread executing on the data processing system 100.

As disclosed herein, the thread priority value tags in each instruction may be used by the system resource to choose between competing requests from different threads. To this end, each system resource may also include arbiter circuitry or logic which extracts the priority values from the instruction tags and uses the priorities extracted from the instruction tags to choose one of the requests to access the system resource. Thus, each L1 cache includes an L1 arbiter (e.g., 17a, 17b, 47a, 47b), each L2 cache includes an L2 arbiter (e.g., 13, 43), the L3 cache includes an L3 arbiter 67, the interconnect bus includes an interconnect arbiter 51, and the memory controller includes an MC arbiter 63. With this structure, the thread priority values are distributed throughout the various hardware resources in the system 100 as tags in the threaded instruction, and may be extracted as needed by each hardware unit.

The system memory device 61 (random access memory or RAM) stores program instructions and operand data used by the processing units, in a volatile (temporary) state, including the operating system 61A and application programs 61B. In addition, the thread priority adjustment module 61C may be stored in the system memory in any desired form, such as an operating system module, hypervisor component, etc, and is used to control the initial priority in the thread priority register for a processor core that is executing the thread (e.g., core 16a). By storing the priority for each thread as a tag in each instruction for that thread, the thread priorities may be propagated through the system 100 as part of the instruction. By selectively extracting the tagged priority values, priorities can effectively be directed to particular registers in the system and not others in order to target thread behavior in particular functions. Although illustrated as a facility within system memory, those skilled in the art will appreciate that thread priority adjustment module 61C may alternatively be implemented within another component of data processing system 100. The thread priority adjustment module 61C is implemented as executable instructions, code and/or control logic including programmable registers which is operative to check performance monitor information for threads running on the system 100, to assign priority values to each thread using predetermined policies, and to tag each instruction with its assigned priority value so that the priority value is distributed across the system 100 with the instruction, as described more fully below.

Those skilled in the art will appreciate that data processing system 100 can include many additional or fewer components, such as I/O adapters, interconnect bridges, non-volatile storage, ports for connection to networks or attached devices, etc. Because such components are not necessary for an understanding of the present invention, they are not illustrated in FIG. 1 or discussed further herein. However, it should also be understood that the enhancements provided by the present invention are applicable to multi-threaded data processing systems of any architecture and are in no way limited to the generalized MP architecture illustrated in FIG. 1.

Figure 2:
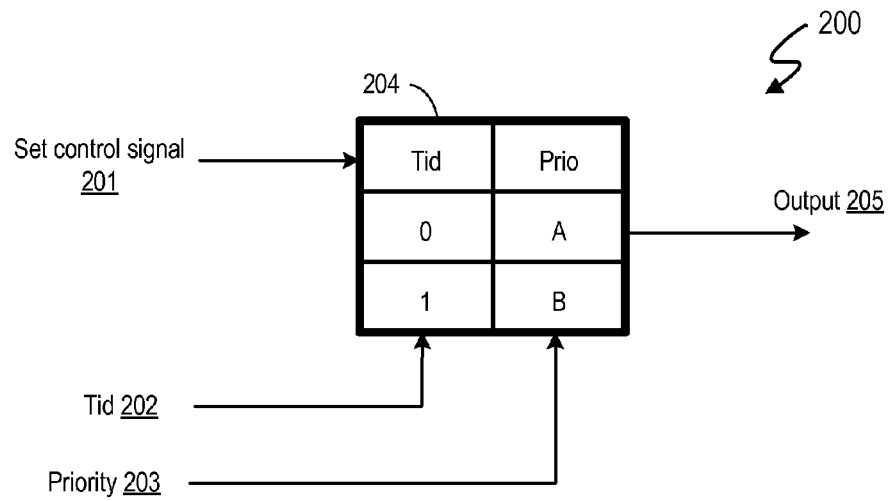
FIG. 2 illustrates a logical view of a thread priority register for tagging instructions in a plurality of threads with priority tags in accordance with selected embodiments of the present invention.

Referring now to FIG. 2, there is depicted a logical view 200 of a thread priority register 204 for tagging instructions in a plurality of threads with priority tags in accordance with selected embodiments of the present invention. In the depicted example, the thread priority table or register 204 stores thread priority values for two threads, where each thread is identified with respective thread ids (tid) {0, 1} and has an assigned thread priority (Prio) value. Thus, the assigned value for tid0 is priority value "A" and the assigned value for tid1 is priority value "B," where "A" and "B" can be any desired representation of one or more priority values. In operation, the thread priority register 204 acts as a table which tracks the assigned priority values for each thread id stored therein. The table 204 can be updated with new thread id priority values by applying a set control input signal 201 in combination with a thread id 202 and priority 203 input signals to thereby update the priority values (Prio) in the register 204 for the entry corresponding to the thread id (Tid). The set control input signal 201 may be controlled by centralized control logic, such as the thread priority adjustment module implemented in the OS or hypervisor. The output 205 of the register entries A and B are the priorities of the threads, which may be organized as signal bundles. Logic downstream from the register 204 uses the priority bundles corresponding to the Tid currently executing in the logic to determine how to allocate resources to the Tid. In this way, the Tid, which already appears to the logic with every request that is being serviced, is associated with its assigned thread priority value.

Figure 3:
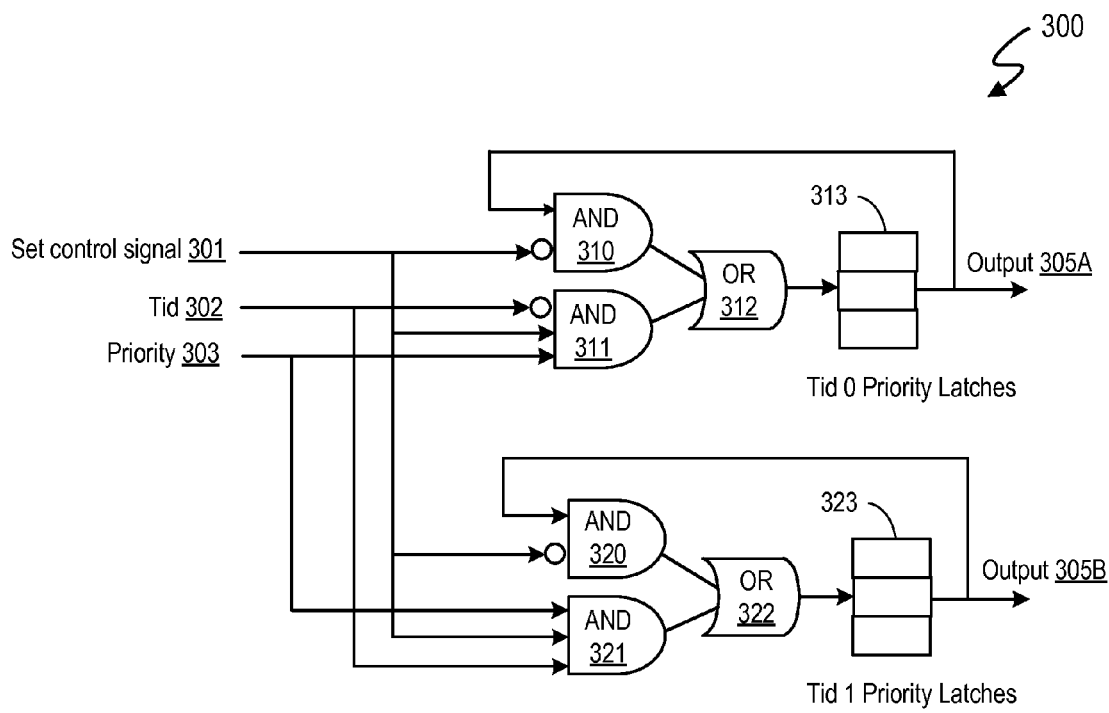
FIG. 3 illustrates an example circuit implementation of the thread priority register depicted in FIG. 2.

While any desired circuit design may be used to implement the functional logic for the thread priority register 204, FIG. 3 illustrates an example circuit implementation of the thread priority register 300. The depicted thread priority register 300 is composed of a plurality of latches and control logic which are configured to receive a set control signal 301, thread id signal 302 and priority signal 303. For example, when the set control signal 301 is set and the Tid input value 302 is applied that corresponds to tid0, the control logic (e.g., AND gates 310, 311 and OR gate 312) applies the input priority signal 303 to update the priority value (Prio) in the tid0 priority latch registers 313. On the other hand, when the set control signal 301 is set and the Tid input value 302 is applied that corresponds to tid1, the control logic (e.g., AND gates 320, 321 and OR gate 322) applies the input priority signal 303 to update the priority value (Prio) in the tid1 priority latch registers 323.

The resulting output of the priority latch registers 313 is the updated priority for thread id 0, while the output of the priority latch registers 323 is the updated priority for thread id 1. The example control logic for each thread effectively maintains the existing priority value in a feedback loop (e.g., through AND gate 310 and OR gate 313) until the set control signal 301 is set, at which time the priority input signal 303 is applied to whichever AND gate 311, 321 is enabled by the Tid input signal 302.

The disclosed thread priority register may be used to tag all instructions in a particular thread with a priority tag that is used by system resources to help make the right system allocation decisions. As an example embodiment, a thread priority register is allocated in hardware for every thread that can execute in the system. Upon dispatch of a thread, priority control logic (e.g., in the hypervisor or OS) executes a store to the thread priority registers based on OS-level priorities for the process initiating the thread. After the store occurs to the thread priority register, the first instruction of the application is fetched and then tagged with the priority. After that point, every instruction fetched for that thread is tagged with the current priority register for that thread. As the instruction is dispatched, the priority follows it through the system by virtue of being included as part of the instruction tag. With the thread priority tags, an instruction or command can flow through the system with a specific priority, and individual hardware resource units can respond to the instruction/commands by using the assigned priority values to decide which instruction/commands to execute first. Specific examples of hardware unit tradeoffs that could be made include:

1. Deciding that core load or prefetch request from a high priority thread gets performed first;
2. Deciding which threads to execute on a core in order to balance thread execution (e.g., give more time to a thread if instructions for that thread currently have a higher priority than the instruction priority in another thread);
3. Dispatching the most important instructions based on instruction thread priority;
4. Reordering data flow (e.g., read data from memory for highest priority instruction first);
5. Performing speculative execution for highest priority streams first;
6. Performing prefetch for highest priority streams first;
7. Reordering of load requests in a memory controller queue based on priority; and
8. Moving execution of low priority instructions onto slower cores.

In selected embodiments, the priority tags are extracted from the instructions with extraction circuitry or logic at each system resource that can be granted access by multiple requesters. Examples of possible locations in the processor system for separate thread priority extraction modules are set forth below in Table 1, which lists candidate locations along with corresponding example actions being requested at each location.

TABLE 1

Candidate Locations for Thread Priority Registers

| Location of Thread Priority Extraction Module | Requestors Qualified by Thread Priority Register Outputs |
|---|---|
| L1 cache arbiter | Request grant |
| L2 cache arbiter | Request grant |
| L3 cache arbiter | Request grant |
| L3 cache arbiter | Prefetch dispatch grant |

TABLE 1-continued

Candidate Locations for Thread Priority Registers

| Location of Thread Priority Extraction Module | Requestors Qualified by Thread Priority Register Outputs |
|---|---|
| Memory controller request command sequencer | Request grant |
| Memory controller request command sequencer | Prefetch dispatch grant |
| Memory controller request command sequencer | Speculative queue grant |
| FXU instruction execution scheduler | Dispatch grant |
| FPU instruction execution scheduler | Dispatch grant |
| LSU instruction execution scheduler | Dispatch grant |
| IFU instruction execution scheduler | Dispatch grant |
| Fabric request arbiter | Fabric request grant |
| Branch predictor selector | Predictor access |
| Branch predictor history table | History table access |

Figure 4:
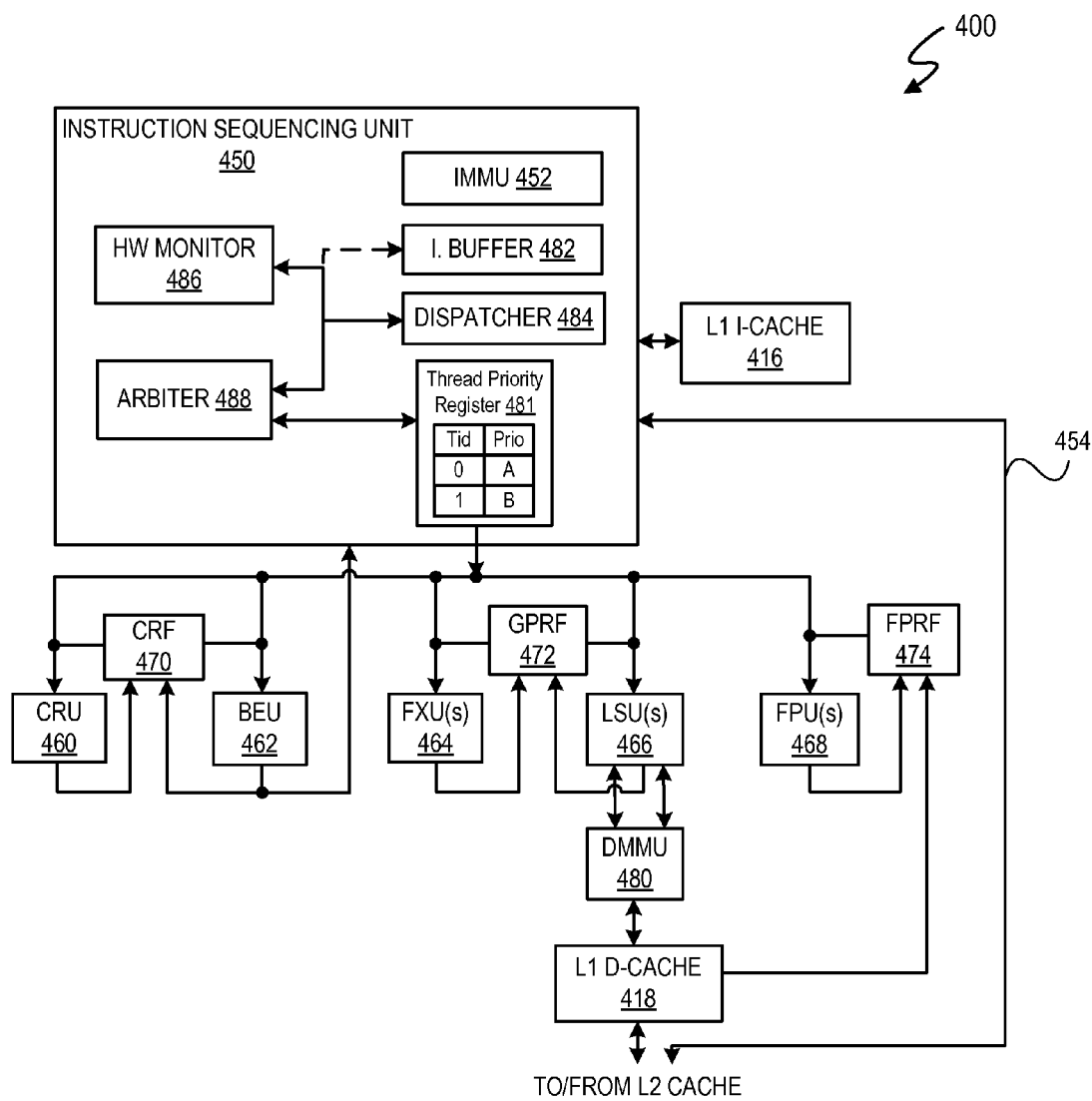
FIG. 4 illustrates a more detailed block diagram of an exemplary processor core within the data processing system illustrated in FIG. 1.

To illustrate how a thread priority register may be used to tag threaded instructions. FIG. 4 depicts a detailed block diagram of an exemplary embodiment of a processor core 400, such as the processor core 16a depicted in FIG. 1. As shown, each processor core 400 includes an instruction sequencing unit (ISU) 450, one or more execution units 60-68, and associated level one (L1) instruction and data caches 416, 418, which temporarily buffer instructions and operand data, respectively, that are likely to be accessed by the processor core. The ISU 450 fetches instructions from L1 I-cache 416 utilizing real addresses obtained by the effective-to-real address translation (ERAT) performed by instruction memory management unit (IMMU) 452. As will be appreciated, ISU 450 may demand fetch (i.e., non-speculatively fetch) instructions within one or more active threads of execution, or speculatively fetch instructions that may or may not ultimately be executed. In either case, if a requested cache line of instructions does not reside in L1 I-cache 416, then ISU 450 requests the relevant cache line of instructions from L2 cache (and/or lower level memory) via I-cache reload bus 454. Instructions fetched by ISU 450 are initially buffered within instruction buffer 482. While buffered within instruction buffer 482, the instructions may be pre-processed, for example, to perform branch prediction or to translate the instructions utilizing microcode. In addition, the buffered instructions may be further processed by arbiter module 488, as discussed further below, in order to prioritize the thread of execution to which the instructions belong.

In operation, the arbiter module 488 tracks and manages the allocation and availability of at least the resources (e.g., execution units, rename and architected registers, cache lines, etc.) within processing core 400 by using a locally-stored thread priority register (TPR) 481 which tracks the priority values assigned to instructions in each instruction thread being executed by the processing core 400. While a tag extraction module could be used at the processor core 400 to extract tagged priority values from the instructions, this is not required when the processor core 400 maintains a thread priority register 481 for storing priority values for each instruction thread executed on the core 400. By storing the assigned thread priority tag values in the TPR 481, any load or store or other fabric instruction generated by the instruction also inherits that priority tag value since it will have the same thread id as its parent. Alternatively, when the thread id already exists as part of instruction execution, operations in the system simply check the thread-specific priority register (or distributed copies of it) to determine the priority of a thread. In the depicted thread priority register 481, two threads are shown with thread ids {0, 1} and corresponding priority levels of {A, B}. Using the priority values assigned to each thread and stored in the TPR 481, the arbiter module 488 allocates resources to instruction threads so that the execution units, registers and cache required for execution are allocated to the prioritized instructions. As the arbiter module 488 allocates resources needed by particular instructions buffered within instruction buffer 482 by reference to thread priority register 481, dispatcher 484 within ISU 450 dispatches the instructions from instruction buffer 482 to execution units 460-468, possibly out-of-program-order, based upon instruction type. Thus, condition-register-modifying instructions and branch instructions are dispatched to condition register unit (CRU) 460 and branch execution unit (BEU) 462, respectively; fixed-point and load/store instructions are dispatched to fixed-point unit(s) (FXUs) 464 and load-store unit(s) (LSUs) 466, respectively; and floating-point instructions are dispatched to floating-point unit(s) (FPUs) 468. After possible queuing and buffering, the dispatched instructions are executed opportunistically by execution units 460-468.

During execution within one of execution units 460-468, an instruction may receive input operands, if any, from one or more architected and/or rename registers within a register file 470-474 coupled to the execution unit. Data results of instruction execution (i.e., destination operands), if any, are similarly written to register files 470-474 by execution units 460-468. For example, FXU 464 receives input operands from and stores destination operands to general-purpose register file (GPRF) 472, FPU 468 receives input operands from and stores destination operands to floating-point register file (FPRF) 474, and LSU 466 receives input operands from GPRF 472 and causes data to be transferred between L1 D-cache 418 and both GPRF 472 and FPRF 474. In transferring data to the L1 D-cache 418, a shared data memory management unit (DMMU) 480 may be used to manage virtual to physical address translation. When executing condition-register-modifying or condition-register-dependent instructions, CRU 460 and BEU 462 access control register file (CRF) 470 which contains a condition register, link register, count register and rename registers of each. BEU 462 accesses the values of the condition, link and count registers to resolve conditional branches to obtain a path address, which BEU 462 supplies to instruction sequencing unit 450 to initiate instruction fetching along the indicated path. After an execution unit finishes execution of an instruction, the execution unit notifies ISU 450, which schedules completion of instructions in program order. Arbiter module 488 also updates TPR 481 to reflect the release of the resources allocated to the completed instructions.

Figure 5:
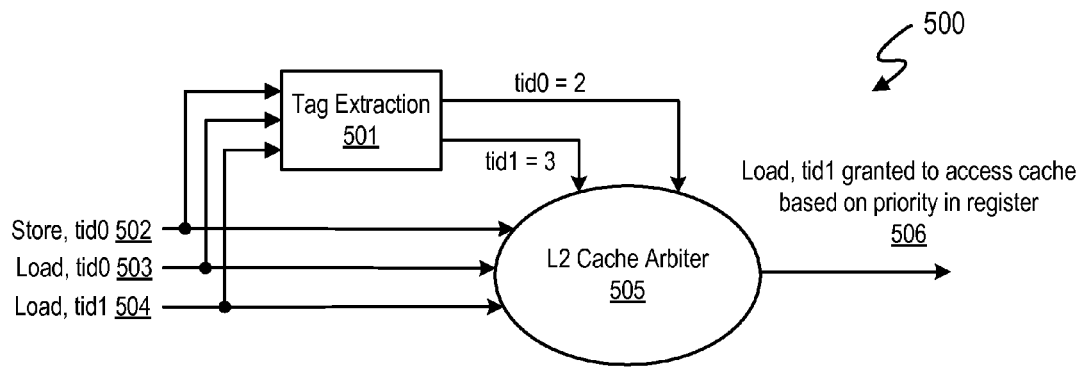
FIG. 5 illustrates a logical view of an example L2 cache arbiter which extracts and uses tagged priority values to choose among competing instruction thread requests to the L2 cache.

To provide an illustration of how thread priority values may be extracted from tagged instructions at a particular hardware resource and used to choose between competing requests being made of the resource, FIG. 5 depicts logical view 500 of an example L2 cache arbiter 505 which uses a tag extraction module 501 to choose among competing requests 502-504 to the L2 cache. In the depicted example, the tag extraction module 501 extracts thread priority values for two threads (tid0 and tid1), each of which is tagged with an assigned thread priority (Prio) value (2 and 3, respectively). The tag extraction module 501 is used by the L2 cache arbiter 505 to obtain the assigned priority values from each thread, which in turn are used by the arbiter 505 to select between competing requests, including an L2 cache "store" request for the tid0 thread 502, an L2 cache "load" request for the tid0 thread 503, and an L2 cache "load" request for the tid1 thread 504. The arbiter 505 takes the requests 502-504, and based on the priority tag values extracted from the tagged instructions 502-504 by the tag extraction module 501, chooses one of the requests to access the L2 cache. In the example of FIG. 5, it is assumed that the priority value "3" for tid1 thread is higher than the priority value "2" for the tid0 thread. Based on this assumption, the arbiter 5 will grant the "load" request from the tid1 thread 506 first, based on the priority values stored in the TPR 501.

Figure 6:
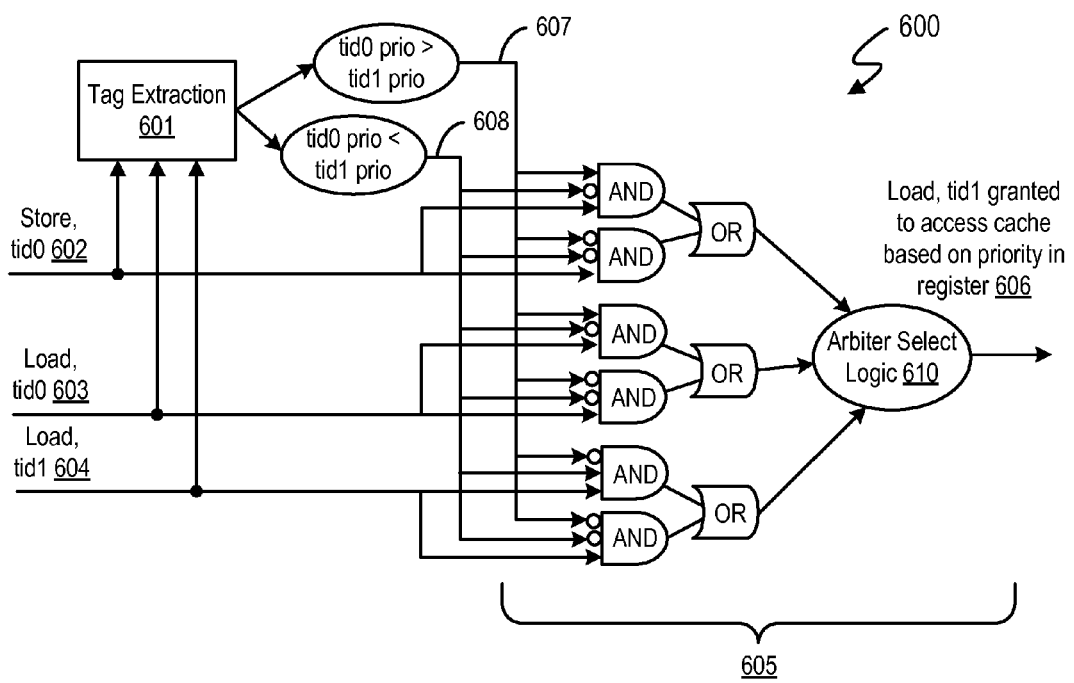
FIG. 6 illustrates an example circuit implementation of the L2 cache arbiter depicted in FIG. 5.

While any desired circuit design may be used to implement the functional logic for the L2 cache arbiter 505, FIG. 6 illustrates an example circuit implementation 600 of the L2 cache arbiter 605 that uses a tag extraction module 601 to choose between competing cache requests 602-604. The depicted arbiter 605 is composed of a plurality of latches and control logic which are configured to receive competing requests 602-604 and to retrieve priority values from the tag extraction module 601. For example, when the output 607 from a comparator downstream from the tag extraction module 601 indicates that the priority for the tid0 thread is higher than the priority for the tid1 thread, selected control logic gates may be activated to pass requests from the tid0 thread (e.g., store request 602 and load request 603) to the arbiter select logic 610. But if the output 608 from another comparator downstream from the tag extraction module 601 indicates that the priority for the tid0 thread is lower than the priority for the tid1 thread, selected control logic gates may be activated to pass requests from the tid1 thread (e.g., load request 604) to the arbiter select logic 610. The arbiter select logic 610 is provided to select between competing requests that are made by a high priority thread or that are selected because they have the same priority value. Additional refinements can be made to the arbiter selection algorithm. For example, the tag extraction module 601 may deselect low priority threads prior to the regular arbiter selection of a request. In addition, weighted selection mechanisms in the arbiter logic can be based on the priorities. Whatever selection algorithm is used by the arbiter 610, back-off mechanisms can be provided in the arbiter select logic to prevent starvation of a thread at an arbiter.

As an instruction stream executes, a thread priority adjustment control may be implemented in the OS, hypervisor or in an application to dynamically adjust the priority for individual threads. Since the OS already has mechanisms to keep track of priority and allow the application or user to adjust these, these same priorities can be used to bias the thread priority. Alternatively, the thread priority adjustment control can monitor the performance status of individual threads, and upon determining that a change in priority is warranted, can change up or down the priority value(s) stored in the thread priority register to thereby impact the performance of the particular thread. An example of a thread priority adjustment control module 61C is depicted in FIG. 1. The thread priority adjustment control module may be constructed to include a resource allocation policy data structure that stores dynamically alterable rules or policies governing the allocation of system resources within data processing system based on the prioritization of threads. For example, resource allocation policy data structure may store rules specifying that arbiter module at a given hardware unit should allocate 30% of execution time in a particular execution unit to a first thread, and allocate 70% of execution time in that execution unit to a second thread based upon the prioritization of the threads with respect to the execution unit resource. In addition, the thread priority adjustment control may be configured to allow human system administrator access to load a desired rule set into policy data structure that optimizes execution of a particular type of workload (e.g., scientific or commercial).

To assist with the dynamic prioritization of the threads, a hardware (HW) monitor (e.g., HW monitor 486 in FIG. 4) is provided for monitoring and/or storing performance status information for the individual hardware components (e.g., in the processor core) which may be used concurrently to execute a plurality of threads. In various forms, the hardware monitor may include circuitry, executable instructions, code and/or control logic which is operative to monitor hardware performance parameters for each executing thread, such as cache misses, branch predictions, core stalls, prefetch hits, load/store frequency, FXU instructions, FPU instructions, application indicators, core utilization, etc.

By providing the performance parameters to the thread priority adjustment control, any of a variety of predetermined policies may be applied to revise the thread priorities based on system conditions. For example, when prompted, the OS/hypervisor code implementing the thread priority adjustment control checks performance status information for a thread and compares this information to thresholds or performance status information for other threads. Based on this comparison, the OS/hypervisor code resets priorities in the thread priority registers. Set forth below in Table 2 is a listing of various performance tests that can be run on individual threads, along with a corresponding policy for adjusting the thread.

TABLE 2

Thread Performance Tests and Corresponding Thread Adjustment Policies

| Thread Performance Observation | Test | Policy for Thread |
|---|---|---|
| CPI (Cycles per Instruction) | Above threshold | High priority to all registers |
| CPI | Below threshold | Low priority to all registers |
| Cache misses | Above threshold | High priority to all caches and memory |
| Cache misses | Below threshold | Low priority to all caches and memory |
| Branch predictability | Above threshold | Low priority to all units |
| Branch predictability | Below threshold | High priority to all units |
| Core stalls | Above threshold | High priority to execution units |
| Core stalls | Below threshold | Low priority to execution units |
| Prefetch hits | Above threshold | High priority to L3 and memory |
| Load/store frequency | Above other thread frequencies | High priority to caches and memory |
| FXU instructions | Above other thread frequencies | High priority to FXU unit |
| FPU instructions | Above other thread frequencies | High priority to FPU unit |
| Application indicators | Priority request | Set priority in all registers for thread |
| Core utilizations | Below threshold | Migrate thread to busy core |
| Core utilizations | Above other core by threshold | Migrate thread to other core |
| Core utilizations | At level better for other core | Migrate thread to other core |

The contemplated tests or comparisons listed in Table 2 are used to achieve thread execution balance relative to thresholds and to performance of other threads. However, in other embodiments the goal may be thread response time, power reduction, etc.

Using the thread priority adjustment control, the priority for a particular thread id may be set by having the thread priority adjustment control execute code to check performance status information provided by the hardware monitor(s). For purposes of illustration, an example pseudocode is shown below which could be used by the OS/Hypervisor uses to check the performance status information for threads and assign priorities by setting the thread priority register values:

```
#define BR_THRESH_LO 0.90
#define PRIO_HIGH 3
#define PRIO_LOW 2
#define CPI_THRESHOLD_HI 3.5
#define CPI_THRESHOLD_LO 0.8
if (CPI(tid0) > CPI_THRESHOLD_HI && CPI(tid1) <
CPI_THRESHOLD_LO) {
    SET_PRIORITY(all_registers, tid0, PRIO_HIGH);
    SET_PRIORITY(all_registers, tid1, PRIO_LOW);
} else if(L2_CACHES_MISSES(tid0) >
L2_CACHE_MISSES(tid1)) {
    SET_PRIORITY(memory_register, tid0, PRIO_HIGH);
    SET_PRIORITY(memory_register, tid1, PRIO_LOW);
} else if (BRANCH_PREDICTABILITY(tid0) <
BR_THRESH_LOW) {
    SET_PRIORITY(execution_units||caches, tid0, PRIO_HIGH);
}
```

In the example pseudocode, the CPIs, cache misses, and branch predictabilities of the threads are compared to thresholds and to each other to determine priorities. This pseudocode also shows the targeting of particular functions based on the comparison results, where CPI( ), L2_CACHE_MISSES( ) and BRANCH_PREDICTABILITY( ) are functions that return the performance status information, and SET_PRIORITY( ) is a function that sets the particular register priority values using the parameters input to the function.

Figure 7:
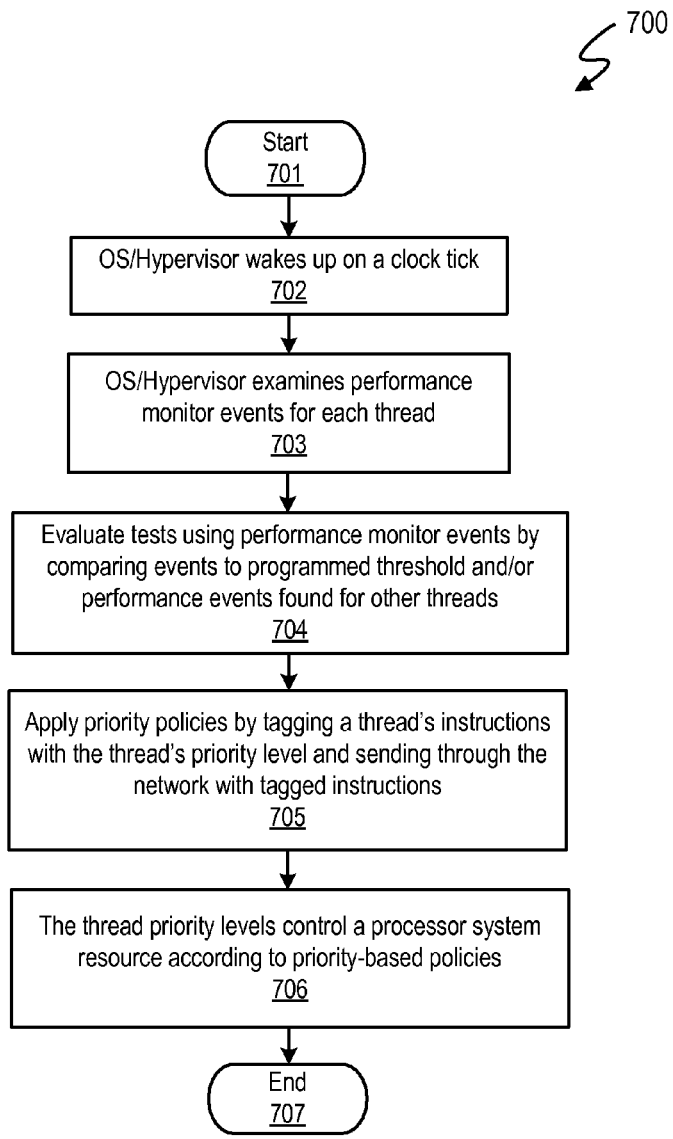
FIG. 7 is a logical flowchart of an example sequence of steps used to generate and distribute thread priority tags for controlling processor system resources in accordance with predetermined priority policies.

To illustrate selected embodiments of the present invention, FIG. 7 is provided to illustrate a logical flowchart of an example sequence of steps 700 used to generate and store thread priorities for controlling processor system resources in accordance with predetermined priority policies. At step 701, the process starts at some point during the operation of the data processing system. At step 702, the thread priority adjustment module wakes up (e.g., on a clock tick) and examines one or more performance monitor events for each thread (step 703). The performance monitor events for a given thread are then evaluated by the thread priority adjustment module by comparing the thread's event(s) to programmed threshold values and/or to performance events from other threads (step 704). For example, pseudocode may be used to check the performance status information for a given thread. Based on the evaluation results, priority adjustment policies (e.g., those listed in Table 2) may be applied to adjust thread priority values for the thread, and the adjusted thread priority values are then used to tag the instructions for that thread which are sent throughout the processor system as tagged instructions (step 705). With the updated thread priority values, the tagged instructions can then be used to control a processor system resource using priority-based policies to allocate the resource amongst competing requests (step 706). Once the thread priority values are updated and distributed, the process ends (step 707) until the next thread priority adjustment module cycle.

Figure 8:
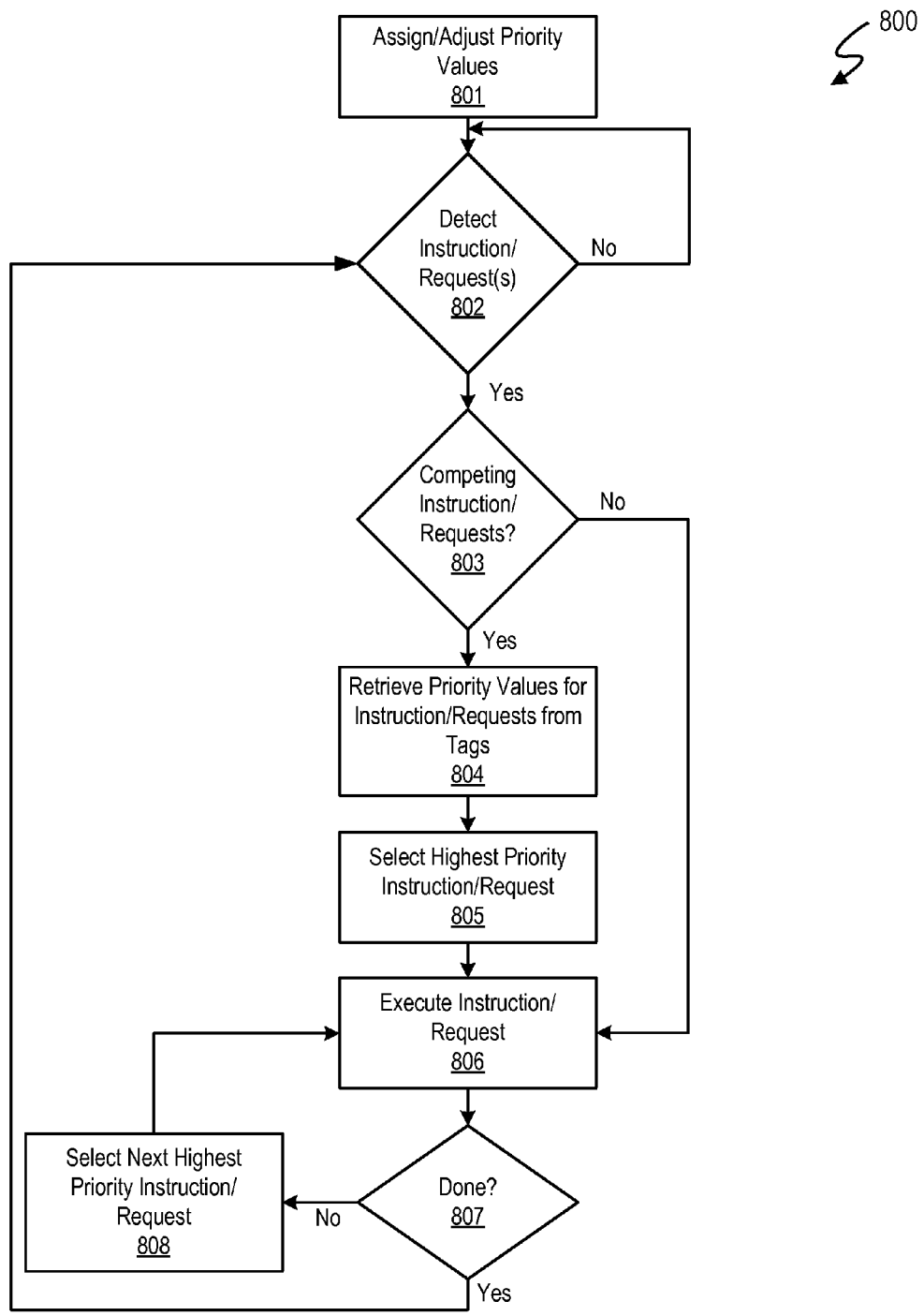
FIG. 8 is a logical flowchart of an example sequence of steps for using priority values to prioritize competing instruction requests.

To further illustrate selected embodiments of the present invention, FIG. 8 is provided to illustrate a logical flowchart of an example sequence of steps 800 for using priority values to prioritize competing instruction requests. At step 801, the process starts at some point during the operation of the data processing system when priority values are assigned to individual threads. Once an instruction or command is detected at a system resource (affirmative outcome to decision 802), it is determined at step 803 if there are any other competing requests for access to the resource. If no competing instructions or commands are detected (negative outcome to decision 803), the pending instruction/command is executed (step 806). However, if one or more competing instructions or commands are detected (affirmative outcome to decision 803), a selection process is initiated by extracting the priority values from the pending tagged instructions/commands (step 804), and then to select the highest priority instruction/command (step 805). The selected instruction/command is then executed (step 806). Upon detecting the presence of any remaining pending instructions/commands (negative outcome to decision 807), the next highest priority instruction/command is selected (step 808) and executed, until all pending instructions/commands are executed (affirmative outcome to decision 807). Once all pending instructions/commands are executed in prioritized sequence, the process ends until the next request for access to the resource is detected (step 802).

In accordance with various embodiments disclosed herein, instructions from different instruction threads may be prioritized in a data processing system under software control using the methodologies and/or apparatuses described herein, which may be implemented in a data processing system with computer program code comprising computer executable instructions. In whatever form implemented, a first priority value is assigned to a first instruction thread and a second priority value is assigned to a second instruction thread. These priority values may then stored in at least a first thread priority register located in the data processing system at a processor location that is executing the instruction threads. Using the stored priority values, instructions from the first instruction thread may be tagged with the first priority value, and instructions from the second instruction thread may be tagged with the second priority value. When a request from a first instruction in the first instruction thread is presented to access the first hardware resource, the first hardware resource is allocated based on the first priority value that is extracted from the tagged instructions. For example, if the first hardware resource is presented with competing requests from instructions in the first and second instruction threads, the first hardware resource is allocated by comparing extracted first priority value to the extracted second priority value so that the instruction thread with the higher priority is given access to the hardware resource. Examples of hardware allocation results include, but are not limited to, selecting a core load or prefetch request from the first instruction thread to be performed before performing a request from another instruction thread when the first instruction thread has a higher priority value. In selected embodiments, each instruction from the first instruction thread is tagged with the first priority value so that the first hardware resource may be allocated based on the first priority value being part of each instruction. In addition, performance status information for an instruction thread may be monitored and used to adjust a priority value for that thread, such as by applying a policy to achieve thread execution balance between the first instruction thread and at least one additional instruction thread. For example, the performance status information may be monitored by measuring a cycles per instruction parameter, a cache miss parameter, a branch predictability parameter, a core stall parameter, a prefetch hit parameter, a load/store frequency parameter, an FXU instruction parameter, an FPU instruction parameter, an application indicator parameter or a core utilization parameter.

As will be appreciated by one skilled in the art, the present invention may be embodied in whole or in part as a method, system, or computer program product. As will be appreciated, the use of instruction tags to distribute priority values will work for heavily threaded core architectures by avoiding the need to have large thread tables at each hardware unit, where each thread table would need to have an entry for all the threads in the system. Thus, in the case of designs which have many threads per core (64 per core or more), the use of tagged instructions to have the priority value included as a tag that follows the instruction through the system provides cost and performance benefits as compared to maintaining thread priority values in large registers or tables at each unit, where each table/register would need to have an entry for all the threads in the system. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable non-transitory storage medium having computer-usable program code embodied in the medium. For example, the functions of adjusting the thread priority levels by applying policies to detected performance conditions at the hardware resources may be implemented in software that is centrally stored in system memory or executed as part of the operating system or hypervisor.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A method for prioritizing instructions in a data processing system comprising:
   assigning a first priority value to instructions in a first instruction thread and a second priority value to instructions in a second instruction thread by tagging each instruction from the first instruction thread to include a first priority tag value and tagging each instruction from the second instruction thread to include a second priority tag value so that tagged instructions in the first and second instruction threads have different priority tag values;
   presenting to a first hardware resource a first tagged instruction request from the first instruction thread and a second tagged instruction request from the second instruction thread;
   extracting the first priority value and second priority value, respectively, from the first tagged instruction request and second tagged instruction request; and
   allocating the first hardware resource to the first tagged instruction request from the first instruction thread or the second tagged instruction request from the second instruction thread by determining at the first hardware resource which tagged instruction request has a higher priority tag value.

2. The method of claim 1, further comprising storing the first and second priority values in a first thread priority register in the data processing system.

3. The method of claim 1, further comprising extracting, at the first hardware resource, the first priority tag value from the first tagged instruction request.

4. The method of claim 1, where the first and second priority values are two different priority values.

5. The method of claim 1, further comprising adjusting the first or second priority levels by applying policies to detected performance conditions at the first hardware resource.

6. The method of claim 1, further comprising:
monitoring performance status information for at least the first instruction thread; and
adjusting at least the first priority value based on the performance status information.

7. The method of claim 6, where adjusting at least the first priority value comprises applying a policy to achieve thread execution balance between the first instruction thread and at least one additional instruction thread.

8. The method of claim 6, where monitoring performance status information comprises measuring a cycles per instruction parameter, a cache miss parameter, a branch predictability parameter, a core stall parameter, a prefetch hit parameter, a load/store frequency parameter, an FXU instruction parameter, an FPU instruction parameter, an application indicator parameter or a core utilization parameter.

9. A computer-usable non-transitory storage medium embodying computer program code, the computer program code comprising computer executable instructions configured for prioritizing instructions in a data processing system by:
assigning a first priority value to instructions in a first instruction thread and a second priority value to instructions in a second instruction thread by tagging each instruction from the first instruction thread to include a first priority tag value and tagging each instruction from the second instruction thread to include a second priority tag value so that tagged instructions in the first and second instruction threads have different priority tag values;
presenting to a first hardware resource a first tagged instruction request from the first instruction thread and a second tagged instruction request from the second instruction thread;
extracting the first priority value and second priority value, respectively, from the first tagged instruction request and second tagged instruction request; and
allocating the first hardware resource to the first tagged instruction request from the first instruction thread or the second tagged instruction request from the second instruction thread by determining at the first hardware resource which tagged instruction request has a higher priority tag value.

10. The computer-usable non-transitory storage medium of claim 9, further comprising computer executable instructions configured for prioritizing instructions in a data processing system by storing the first and second priority values in a first thread priority register in the data processing system.

11. The computer-usable non-transitory storage medium of claim 9, further comprising computer executable instructions configured for prioritizing instructions in a data processing system by extracting, at the first hardware resource, the first priority tag value from the first tagged instruction request.

12. The computer-usable non-transitory storage medium of claim 9, where the first and second priority values are two different priority values.

13. The computer-usable non-transitory storage medium of claim 9, further comprising computer executable instructions configured for prioritizing instructions in a data processing system by adjusting the first or second priority levels by applying policies to detected performance conditions at the first hardware resource.

14. The computer-usable non-transitory storage medium of claim 9, further comprising computer executable instructions configured for prioritizing instructions in a data processing system by:
monitoring performance status information for at least the first instruction thread; and
adjusting at least the first priority value based on the performance status information.

15. The computer-usable non-transitory storage medium of claim 14, where adjusting at least the first priority value comprises applying a policy to achieve thread execution balance between the first instruction thread and at least one additional instruction thread.

16. The computer-usable non-transitory storage medium of claim 14, where monitoring performance status information comprises measuring a cycles per instruction parameter, a cache miss parameter, a branch predictability parameter, a core stall parameter, a prefetch hit parameter, a load/store frequency parameter, an FXU instruction parameter, an FPU instruction parameter, an application indicator parameter or a core utilization parameter.

17. A data processing system comprising:
a processor for executing a plurality of instruction threads, said processor comprising one or more processor resources, such as a cache memory, memory controller, interconnect bus or interconnect controller; and
a computer-usable medium embodying computer program code, the computer-usable medium being coupled to the data bus, the computer program code comprising instructions for prioritizing instructions in the data processing system by:
assigning a first priority value to instructions in a first instruction thread and a second priority value to instructions in a second instruction thread by tagging each instruction from the first instruction thread to include first priority tag value and tagging each instruction from the second instruction thread to include a second priority tag value so that tagged instructions in the first and second instruction threads have different assigned priority tag values;
presenting to a first hardware resource a first tagged instruction request from the first instruction thread and a second tagged instruction request from the second instruction thread;
extracting the first priority value and second priority value, respectively, from the first tagged instruction request and second tagged instruction request; and
allocating the first hardware resource to the first tagged instruction request from the first instruction thread or the second tagged instruction request from the second instruction thread by determining at the first hardware resource which tagged instruction request has a higher priority tag value.

18. The data processing system of claim 17, further comprising a thread priority register located at one or more processor resources for storing the first and second priority values.

19. The data processing system of claim 17, further comprising extracting, at the first hardware resource, the first priority tag value from the first tagged instruction request.

20. The data processing system of claim 17, where the processor comprises one or more processor cores, where each processor core processes two or more instruction threads.

* * * * *